US008983878B2

(12) United States Patent  
Dorin et al.

(10) Patent No.: US 8,983,878 B2
(45) Date of Patent: Mar. 17, 2015

(54) COMPUTER-IMPLEMENTED METHOD FOR OPTIMIZING AN INJECTION-MOLDING PROCESS FOR PRODUCING THICK-WALLED COMPONENTS

(75) Inventors: Florian Dorin, Cologne (DE); Christoph Klinkenberg, Cologne (DE); Olaf Zoellner, Leverkusen (DE)

(73) Assignee: Bayer MaterialScience AG (DE)

( * ) Notice: Subject to any disclaimer, the term of this patent is extended or adjusted under 35 U.S.C. 154(b) by 500 days.

(21) Appl. No.: 13/501,787

(22) PCT Filed: Oct. 12, 2010

(86) PCT No.: PCT/EP2010/065279
§ 371 (c)(1), (2), (4) Date: Apr. 13, 2012

(87) PCT Pub. No.: WO2011/045314
PCT Pub. Date: Apr. 21, 2011

(65) Prior Publication Data
US 2012/0203375 A1    Aug. 9, 2012

(30) Foreign Application Priority Data
Oct. 16, 2009   (EP) .................................. 09013073

(51) Int. Cl.
G06F 15/18 (2006.01)
G06F 17/50 (2006.01)
(52) U.S. Cl.
CPC ........ G06F 17/5009 (2013.01); G06F 2217/41 (2013.01)
USPC .......................................... 706/12

(58) Field of Classification Search
CPC ............................... B29C 33/00; B29C 33/38
USPC .................................. 706/12, 45, 62
See application file for complete search history.

(56) References Cited

U.S. PATENT DOCUMENTS

| 5,792,483 | A * | 8/1998 | Siegrist et al. | 425/135 |
| 2003/0152018 | A1* | 8/2003 | Medower et al. | 369/272 |
| 2005/0019530 | A1* | 1/2005 | Merrill et al. | 428/156 |
| 2005/0046060 | A1* | 3/2005 | Nagaoka et al. | 264/40.1 |
| 2006/0197247 | A1* | 9/2006 | Speight | 264/40.1 |
| 2007/0063378 | A1* | 3/2007 | O'Donoghue | 264/219 |

OTHER PUBLICATIONS

Ozcelik, Babur, and Tuncay Erzurumlu. "Comparison of the warpage optimization in the plastic injection molding using ANOVA, neural network model and genetic algorithm.", 2006, Journal of materials processing technology pp. 437-445.*

* cited by examiner

*Primary Examiner* — David Vincent
(74) *Attorney, Agent, or Firm* — Drinker Biddle & Reath LLP

(57) ABSTRACT

A computer-implemented method for optimising an injection moulding process for producing thick-walled components based on a model parameterised on the basis of parameters to be predetermined is provided, wherein a component to be produced is represented in the model with a component geometry, and the method comprises at least the following steps: e) defining a group of parameters as primary characteristics on the basis of a relative influence of the parameters on a predetermined model response, and f) defining parameter values for the primary characteristics as starting values for a subsequent optimisation of the model and of respective tolerance ranges for the primary characteristics, c) optimising the parameter values of the individual primary characteristics with respect to a desired value of the model response in the respective tolerance ranges, proceeding from the starting values from step a), and d) setting the optimised parameter values from step c) as the corresponding starting parameter values on an injection-moulding machine.

14 Claims, 1 Drawing Sheet

COMPUTER-IMPLEMENTED METHOD FOR OPTIMIZING AN INJECTION-MOLDING PROCESS FOR PRODUCING THICK-WALLED COMPONENTS

PRIORITY

Priority is claimed as a national stage application, under 35 U.S.C. §371, to PCT/EP2010/065279, filed Oct. 12, 2010, which claims priority to European Application No. 09013073.3, filed Oct. 16, 2009. The disclosures of the aforementioned priority applications are incorporated herein by reference in their entirety.

TECHNICAL FIELD

The invention relates to a computer-implemented method for optimising an injection-moulding process for producing thick-walled components based on a model parameterised on the basis of parameters to be predetermined. Furthermore, the present invention relates to a corresponding computer program, which implements the proposed method when implemented on a processing unit. The method according to the invention serves in particular to increase productivity in thermoplastic injection-moulding processes for producing thick-walled components, such as e.g. optical components.

DESCRIPTION OF THE PRIOR ART

Optical lenses made of thermoplastics or other organic and inorganic plastics, e.g. for image-forming or light-shaping (non-image-forming) purposes, are currently being produced or developed in an injection-moulding process including various special injection-moulding methods, such as e.g. injection-compression moulding or dynamic temperature control of the corresponding mould.

Injection moulding is the basis of all other injection-moulding processes and is the most frequently used plastics processing method overall. It is conventional today to use as the injection-moulding machine a so-called reciprocating screw injection-moulding machine, which generally takes in plastics in the form of pellets from a hopper into screw channels in the machine, distributes them and shears them. The resulting frictional heat, together with the heat supplied by a heated barrel, ensures a relatively homogeneous melt. This melt collects in front of the tip of the retracting screw. In a so-called injection phase, the screw of the reciprocating screw injection-moulding machine is placed under pressure from behind, hydraulically or by mechanical force. In this phase, the melt is pressed under high pressure, generally between 500 and 2000 bar, through a non-return valve, the nozzle which is pressed against the injection-moulding tool, optionally a hot runner system and a gate into a shaping impression, a so-called cavity, in the temperature-controlled injection-moulding tool. A reduced pressure continues to act as a so-called holding pressure on the melt until the gate, also called the sprue, hardens or sets. This largely compensates for any volume shrinkage arising during cooling. This is important for dimensional stability and desired surface quality. After this, the screw begins to rotate. In this way, the shot weight for the following moulding is prepared. During this time, the moulding can continue to cool in the mould until the material in the core has also set. The mould then opens and ejects the finished component.

The locking force is the force that holds the corresponding mould closed against injection and holding pressures.

The impression, or cavity, of the mould determines the shape and the surface texture of the component to be produced. The screw profile is also an important injection-moulding parameter, with a screw being either a single-flighted three-zone screw with a feed zone, a compression zone and a metering zone, or a barrier screw, generally to increase output, or a PVC constant taper screw.

To simulate an injection-moulding process, so-called Computer Aided Engineering programs, abbreviated to CAE programs, are frequently used today. However, these focus on appropriate mould-filling processes and not on minimising cycle times or predicting component quality in multi-component injection moulding of thick-walled components. As well as these CAE programs, there are programs that are capable of parameterising simulation calculations. Parameterising here means, on the one hand, a change to boundary conditions, such as e.g. melt temperature, mould temperature, holding pressure etc., and on the other hand a change to geometries. Thus, for example, in a multi-layer injection moulding process a corresponding component can be divided into multiple layers, which are injected successively or in parallel. More details of this can be taken from the document by Döbler, Protte, Klinkenberg "Freie Fahrt für weißes Licht—LED-Optiken", published in Kunststoffe April 2009, pages 83 to 86. Furthermore, reference can also be made to the document by Stricker, Pillwein, Giessauf "Präzision im Fokus—Spritzgießen optischer Formteile", published in Kunststoffe April 2009, pages 30 to 34. Through the possibility of parameterisation, influences of individual parameters on e.g. cooling time and component quality can be investigated and optimised. Rheological simulations and commercial optimisers cannot, at present, be adequately combined. Although other CAE programs, which can be combined with optimisers, can model temperature behaviour, this is only to a limited extent, taking account of a particular injection-moulding process. Moreover, the quantitative results can only be put into practice to a limited extent since some parameters, which have an important effect on cooling behaviour, cannot yet be measured directly.

In addition, various technologies for injection moulding optical lenses are known, which can also be taken from the above-mentioned document by Stricker, Pillwein and Giessauf. Up to the present, however, optimisation of an injection-moulding process always takes place by means of a cumbersome so-called "trial and error" process, which is generally expensive and lengthy. Since extremely long cycle times of up to 20 minutes are needed for thick-walled components, "trial and error" tests are very time-consuming. While a simulation can be similarly lengthy, however, it can be automated and does not have to be monitored by staff during continuous calculating processes. Only the preparation and evaluation are labour-intensive here.

In a publication "Application of neural network and computer simulation to improve surface profile of injection moulding optic lens" by T. S. Kwak et al., the authors investigate the creation of neural networks to design lenses. However, this deals with the production of lenses by the so-called "single-layer" method. A CAE program is implemented here in order to develop a neural network model. One of the aims was to minimise the optimisation grinds needed. This publication focuses on so-called camera lenses with a well-defined geometry and limited thickness.

Multi-layer injection moulding is a suitable manufacturing technology for thick-walled lenses. In this process, the component to be produced is injection-moulded stepwise in multiple layers. As a function of the wall thickness distribution, the arrangement of the respective layers, the sequence of the "partial shots" and different mould temperatures in the individual cavities, among other factors, improvements in component quality and, at the same time, significantly shorter cycle times can be achieved in multi-layer injection moulding in comparison to single-layer injection moulding. A reduction in cycle times can, inter alia, be attributed to the fact that the wall thickness of the component to be produced enters into the cooling time formula quadratically. Of course, it is important to bear in mind here that the total potential of a reduction in wall thickness cannot be exhausted, since there is only optimum heat dissipation for a second layer in the mould direction. The calculation of the optimum wall thickness distribution presents an engineer with particular challenges, since a change in wall thickness also changes the cooling time of the preform.

The preform should only be cooled until it is sufficiently cold to allow it to be demoulded, however. The fact that there are manufacturing parameters for the pre- and post-form increases the number of variables for optimisation, which are also, at the same time, all interdependent. As a result of these dependences and the large number of variables, both the complexity of the model and the number of possible optima increase.

In optimisation methods known from the prior art, there are material parameters (which can be measured more or less readily), which are fixed, and process parameters as variables. An optimisation based solely on process parameters is already very complex, but is accepted as prior art (cf. e.g. the document "Adaptive Multiobjective Optimization or Process Conditions for Injection Molding Using a Gaussian Process Approach" by Jian Zhou et al., XP002573114). In multi-layer injection moulding, the number of parameters is increased by so-called morphing parameters (variance of wall thicknesses more or less locally), and the number of process-related parameters is multiplied by the number of layers that are produced, since the layers can be manufactured successively in process steps that are independent of one another. For each process step, the first-mentioned parameters apply again individually and independently of the other process steps.

In optimisation methods known from the prior art, there are material parameters (which can be measured more or less readily), which are fixed, and process parameters as variables. An optimisation based solely on process parameters is already very complex, but is accepted as prior art (cf. e.g. the document "Adaptive Multiobjective Optimization or Process Conditions for Injection Molding Using a Gaussian Process Approach" by Jian Zhou et al., XP002573114). In multi-layer injection moulding, the number of parameters is increased by so-called morphing parameters (variance of wall thicknesses more or less locally), and the number of process-related parameters is multiplied by the number of layers that are produced, since the layers can be manufactured successively in process steps that are independent of one another. For each process step, the first-mentioned parameters apply again individually and independently of the other process steps.

The cycle times needed to achieve the high qualities often demanded in optical components are generally very high and, particularly for thick-walled lenses, are in the range of 5 to 20 minutes and sometimes even more. This currently makes it uneconomical to use such lenses produced as standard in mass production, such as e.g. in the car industry or for other lighting purposes using LEDs.

A need therefore exists for a method, with the aid of which corresponding cycle times can be reduced still further in the production of optical components, particularly by the multi-layer injection moulding process, so that rational manufacture becomes possible even for mass markets, such as in the case of LED lighting. At the same time, however, the highest possible quality of the respective lenses should be achieved.

SUMMARY OF THE INVENTION

Accordingly, one object of the present invention lies in providing a method of optimising a method for producing thick-walled components, in particular thick-walled optical lenses, and providing an injection-moulding process for optical precision components, which can operate with significantly shorter cycle times compared with the prior art.

A computer-implemented method for optimising a multi-layer injection moulding process for producing thick-walled components based on a model to be parameterised on the basis of parameters to be predetermined is proposed. In this method, a thick-walled component is represented in the model with a component geometry. The proposed method comprises at least the following steps:

a) determining, for each of the individual parameters, a value for a predetermined model response for various parameter values of the respective parameter and a resulting relative influence of the individual parameters on the value for the model response, b) defining a group of parameters as primary characteristics on the basis of the relative influence of the parameters on the predetermined model response, c) determining a correlation of the primary characteristics in relation to the value for the model response for various parameter values of the individual primary characteristics, d) defining parameter values for the primary characteristics as starting values for subsequent optimising of the model and respective tolerance ranges for the primary characteristics, e) optimising the parameter values of the individual primary characteristics in terms of a target value of the model response in the respective tolerance ranges proceeding from the starting values from step d), f) setting the optimised parameter values of the individual primary characteristics from step e) as corresponding starting parameter values on an injection-moulding machine.

In the context of the present invention, a model response is understood to be a result value which is obtained from the present simulation or the corresponding model. Depending on the target set, a desired model response can be predetermined here, the value of which is then determined with the aid of the proposed method for respective values of the individual parameters and finally optimised by the proposed method in terms of a target value.

A primary characteristic in the context of the present invention refers to a parameter which belongs to those parameters that have a large effect on the corresponding model response or on its value in comparison with other parameters. The number of primary characteristics to be determined here depends on an optional determination or a definition of the term "greatest influence" on the respective value of a desired model response.

According to the invention, firstly in step a), for each individual parameter, a value is determined for the predetermined model response for various parameter values of the respective parameter, together with a resulting relative influence of the individual parameters on the value for the model response, while in step b) the defining of the group of parameters as primary characteristics then takes place on the basis of the relative influence of the individual parameters determined in this way. In step c), a correlation of the primary characteristics in relation to the value for the model response for various parameter values of the individual primary characteristics is then determined, while in step d), the parameter values for the primary characteristics are then defined as starting values for the subsequent optimising of the model and of the respective tolerance ranges for the primary characteristics on the basis of the correlation determined in this way.

Before carrying out step b), accordingly in step a), when calculating the value for the model response for one of the various parameter values of a first parameter, this parameter value is input into the model in respective combination with all of the various parameter values of the other parameters and an average is formed from the resulting values for the model response in each case, which is then allocated to the parameter value of the first parameter as the value for the model response. This procedure is followed for all of the other parameters with regard to their respective different parameter values. A joint consideration of the respective values for the model response thus obtained allows a conclusion to be drawn on the relative influence of the individual parameters on the value of the model response. Such a consideration or evaluation takes place e.g. graphically.

While it is true that, as described above, the respective relative influence of the individual parameters can be determined by simulation, however, in terms of the relative influence it is also possible to fall back on experimental values for the individual parameters. The same applies to a defining of the parameter values of the primary characteristics as starting values for subsequent optimisation. Here too, experimental values may be called upon.

In one possible embodiment of the proposed method, in addition to an overall shape, the component geometry comprises a variable number of layers and a respective thickness of these layers. The geometric shape of these layers in the component is also variable. A structure of this type is relevant e.g. in the multi-layer injection moulding process mentioned at the beginning, and a component produced by this method generally has such a structure. Components to be produced in this way, as already mentioned at the beginning, can be optical lenses.

With the aid of the method according to the invention, the number of optima can be reduced and the range in which the optima can lie can be limited, so that with the aid e.g. of the methods of optimisation named in the document XP-002573114 mentioned at the beginning, or indeed other methods known from the prior art, further optimisation is possible. In this way, with a small number of calculations, a large number of calculations can be avoided.

Furthermore, with the method according to the invention, the parameters can be limited and in some cases even "removed", i.e. no longer considered, and thus reduced. After reducing the parameters according to the invention, optimisation is then also performed, which is valid for a component-independent multi-layer injection moulding process.

In another possible embodiment of the proposed method, the target value of the model response corresponds to an extreme value, in particular a maximum or minimum of the model response.

Furthermore, it is conceivable for suitable starting values for optimising the model to be determined not only for the primary characteristics but also for the remaining parameters. To this end, in the proposed method, while retaining the optimised values for the primary characteristics determined in step e), the following additional steps are provided:

e1) determining a correlation of the remaining parameters in relation to the value for the model response for various parameter values of the individual remaining parameters and, from there, defining parameter values for the remaining parameters as starting values for the subsequent optimising of the model and of respective tolerance ranges for the remaining parameters, e2) optimising the parameter values of the remaining parameters in terms of the target value of the model response in the respective tolerance ranges proceeding from the starting values from step e1), wherein step e1) and step e2) are to be carried out after step e).

It can be provided that the method further comprises the following step:

e3) determining the value for the model response for the optimised parameter values.

In one possible embodiment of the method according to the invention, the parameters to be predetermined are selected from a group consisting of component geometry parameters and from injection-moulding parameters.

The component geometry parameters here can be a layer thickness and a number of layers of the component to be produced.

The injection-moulding parameters are generally settings on an appropriate injection-moulding machine. These can be e.g. mould temperatures, melt temperatures, pressures, cooling times, injection profile, change-over point and holding pressure profile. Other parameters can be: cooling rates at the mould wall and other thermal properties of the mould.

It is possible here that the respective parameters to be predetermined are predetermined as a function of another variable, such as temperature, time or another freely selectable field variable.

In determining the relative influence of the parameters (with their different parameter values) on the model response, when determining the value for the model response for a particular parameter according to one embodiment of the method, for each of the individual parameters, 1 to 5 parameter values, in particular 2 parameter values, e.g. a minimum and a maximum value, are given. For these various parameter values of a particular parameter, the value for the predetermined model response is then determined and, from this, a relative influence of the particular parameter on the value for the model response in comparison to the other parameters is given. In determining the value for the model response for a parameter value of a first parameter, the parameter values of the remaining parameters are varied in such a way that the one parameter value of the first parameter is combined with all of the parameter values of the other parameters, a respective value of the model response is calculated for all combinations and an average is formed from the total of the values of the model response, which is then allocated to the one parameter value of the first parameter as the value of the model response. The same is carried out for the other predetermined parameter values of the first parameter and for each of the various parameter values of the other parameters. If, for example, only two parameters A and B have been predetermined, and for parameter A two different parameter values 1 and 2 and for parameter B two different parameter values 1' and 2', then in a first calculation, parameter A with parameter value 1 and parameter B with parameter value 1' are calculated, in a second calculation parameter A with parameter value 1 and parameter B with parameter value 2', and to determine the relative influence of parameter A on the value of the model response, for parameter value 1 the average of the values obtained for the model response from the first and second calculations is determined. The same is carried out for parameter value 2. A similar procedure is followed for parameter B and the corresponding parameter values 1' and 2'. A comparison is then made of how the change in parameter A, parameter value 1 and parameter value 2, affects the model response or its value in comparison to a change of parameter B, parameter value 1' and 2'. To use an example, this means that: in the case of 2 parameter values each for the parameters A and B, for each parameter there are two values for the model response, consequently, entered in an x-y diagram, accordingly two points each, namely for parameter A (1, model response (1)) and (2, model response (2)) and for parameter B (1', model response (1')) and (2', model response (2')). If each of the two points are joined for each of the parameters, a straight line is obtained for each of the two parameters. The slope of the straight line in each case shows the influence of the respective parameter on the value for the model response. The greater the value of the slope, the greater the influence.

The resulting relative influences of the individual parameters on the value for the model response in each case are compared and, from this, a group of parameters can then be defined as primary characteristics. This means that, as a rule, those parameters which, in comparison to the remaining parameters, have a high relative influence on the value of the model response are defined as primary characteristics.

For these primary characteristics that have then been defined, a correlation can then be determined in relation to the value for the model response based on various parameter values of the individual primary characteristics. This means that the primary characteristics are not considered independently of one another in this step, but rather in combination and in correlation with one another. It is possible here to determine the dependences of 2 primary characteristics on one another. In a graphic evaluation, it is conceivable to enter as the dependent variable y in an x-y diagram the model response, such as e.g. the cycle time, and as the independent variable x a first primary characteristic, such as e.g. a parameter A, the model response then being calculated for various parameter values, such as e.g. parameter value 1 and parameter value 2, of parameter A and the resulting points being entered accordingly in the x-y diagram. An entry of this type is made for each of various parameter values, e.g. parameter value 1' and 2', of a second primary characteristic, such as e.g. a parameter B, as a result of which, depending on the number of parameter values for the second primary characteristic, a corresponding number of entries or graphs is obtained, the relationship of which to one another provides information on the correlation of the first and second primary characteristics. If the entries run substantially parallel to one another, this allows a low correlation to be concluded, and if the entries do not run parallel, a recognisable correlation is present. On the basis of a correlation of the primary characteristics in relation to the value for the model response determined in this way, it is then possible to define parameter values for the primary characteristics, which are used as starting values for subsequent optimising of the model. Furthermore, on the basis of this determination of the correlation of the primary characteristics with one another, respective tolerance ranges can be derived for the primary characteristics. In determining the correlation, the parameter values for the remaining parameters, i.e. those not coming into consideration for the correlation, are kept constant. In each case, a value that is relevant in practice is assumed for these. If, for example, the holding pressure is not a primary characteristic, i.e. if a fixed value is to be assumed for this, this parameter value will be selected as low as possible, both in practice and in the model, to save material and energy, i.e. a parameter value which is favourable for material and processing technology.

The correlation of the primary characteristics can be determined e.g. by introducing a covariance, which produces an interrelationship of primary characteristics in relation to the value for the model response.

In one possible embodiment of the method, 1 to 5 parameters are defined as primary characteristics, starting with the parameter with the greatest relative influence and, in the case of more than one parameter, continuing with the immediately following parameters in terms of relative influence. This means that the five parameters with the greatest relative influence on the value of the predetermined model response are used as primary characteristics in general, and their correlation with one another is determined in relation to the value for the model response. It is possible in this case that, when determining a correlation of the primary characteristics in relation to the value for the model response for various parameter values of the individual primary characteristics, in each case 3 to 10 different parameter values are used for the individual primary characteristics. It can be provided here that a total of 5 different parameter values are used for the individual primary characteristics.

On the basis of the determination of the correlation, parameter values are then defined for the primary characteristics, which are used as starting values for a subsequent optimisation. Furthermore, for the respective primary characteristics and the defined parameter values, respective tolerance ranges for the primary characteristics are determined, which are also entered into the subsequent optimisation. As starting values, it is possible to use those parameter values for the primary characteristics which lead to a value that is as close as possible to the target value for the predetermined model response. While retaining the starting values for the primary characteristics defined in this way, for the remaining parameters, by determining their correlation with one another in relation to the value for the model response, further starting values for these parameters can be defined which then also influence a subsequent optimisation.

The defined starting values are now used to optimise the parameters in terms of a target value of the model response in the respective tolerance ranges and to determine the value of the model response obtained in this way. As a rule, this type of optimisation is performed by drawing on or utilising a commercial optimiser, such as e.g. "HyperStudy®", wherein the parameters, in particular the primary characteristics, are varied within the defined tolerance ranges and an optimum combination of parameter values is determined from this for the individual primary characteristics. The resulting optimised parameter values are then used as corresponding starting parameter values on a corresponding injection-moulding machine for producing a corresponding component, in particular an optical component.

After defining and setting the starting parameter values on a real injection-moulding machine, these can again be further adjusted and optimised in practical tests.

With the aid of the method according to the invention, it is accordingly possible to establish relative influences of parameters on the value of a predetermined model response of a parameterised model representing an injection-moulding process rapidly and automatically and, with the aid of targeted variation of the respective parameter values, to perform an optimisation of the parameterised model so that, in contrast to the prior art, a "trial and error" method is no longer necessary in order to finally obtain an optimisation of the corresponding injection-moulding process.

In one possible embodiment of the proposed method, the model response is predetermined from the group consisting of maximum temperature in the component to be produced, total duration of the injection-moulding process and time to the earliest possible point for demoulding. This means that, for example, if the model response is predetermined as a time to the earliest possible point for demoulding, in step a1) of the proposed method in each case a value for the time to the earliest possible point for demoulding is determined for various parameter values of the respective parameter, which is carried out separately for all of the parameters to be predetermined, from which a resulting relative influence on the value for the time to the earliest possible point for demoulding is obtained for each of the individual parameters. This means that the parameters which, considered independently, have a relatively high or low influence on the time to the earliest possible point for demoulding can be derived from this.

In the event that it is desired to reduce cycle times in the production process for an optical component using an injection-moulding process, it is desirable to minimise the earliest possible point for demoulding or the time to reach the earliest possible point for demoulding. With this specification, the actual optimisation step c) takes place, so that concrete parameter values can be defined for the primary characteristics as starting parameter values for a real injection-moulding machine.

The parameters to be predetermined can on the one hand, as already mentioned, be injection-moulding parameters, i.e. parameters that are connected with the actual injection moulding operation. These are e.g. melt temperature of the material used for producing the respective component, mould temperature of the mould used for the injection moulding, cooling time, i.e. how long the mould, together with the injection-moulded component therein, is cooled, and rate of cooling. Furthermore, the injection-moulding parameters include the so-called change-over point, which is defined by injection time, injection pressure, screw position, locking force and volume. Other injection-moulding parameters are the holding pressure profile, which is determined by the duration and level of the holding pressure needed, and an injection profile, which is obtained from injection time, volume throughput, screw position and rate of advance of the screw.

Furthermore, material properties are to be regarded as boundary conditions, although these are substantially to be assumed as fixed values and are not generally varied. Material properties are the properties of the material that is used for producing the component, e.g. the optical component, and is accordingly injected into the injection-moulding tool. Material properties include, in particular, heat capacity, thermal conductivity, thermal expansion and the so-called no-flow temperature. This no-flow temperature is a temperature limit, for which it is assumed that the particular material, such as e.g. a plastics material that is being used, no longer flows when cooled below this temperature. This no-flow temperature is an empirically determined value. Furthermore, the material properties include the transition temperature as well as the glass transition temperature or second order transition temperature, the solidification point, the melt temperature, the so-called D3 coefficient, which expresses a pressure dependency of the viscosity, and a so-called C1/C2 coefficient, which expresses a so-called juncture loss, i.e. a loss of pressure at the inlet. Furthermore, viscosity, creep behaviour, modulus of elasticity, density and PVT data of the material to be used should be taken into account. These material properties must be taken into account at least partially, and ideally completely, in the modelling. While it is true that the material properties can also be parameterised and optimised, however, the material would then have to be adapted appropriately, which would generally entail material development. It would certainly not necessarily be possible to implement this 100% towards achieving the desired parameters, i.e. the optimised parameter values; such adaptations could only be made within the framework of what is chemically and physically possible.

Other influences are represented by gravity, inertia and the component material/mould transition temperature. The component material/mould transition temperature cannot currently be measured with sufficient accuracy, but can only be determined by so-called reverse engineering. In general, the component material, i.e. the material that is used for producing the component, is a plastic material. By means of a suitable measuring method, which is not dealt with in detail here, these thermal material data (heat capacity, thermal conductivity and also the heat transfer coefficient) have been successfully determined. With the data determined in this way, it is now possible to produce appropriate optimisations for geometries of any complexity with different numbers of layers. Because these material data are determined very accurately and quantitatively (even as a function of pressure and temperature in some cases), it is possible, in contrast to the prior art, to make predictions, within the limits of accuracy of the uncertainties, by FE simulation plus material data. Thus, it may be assumed that, independently of component geometry, an optimum is selected which takes account of the connection between cooling time and build quality. The number of trial-and-error tests is then reduced to the area around the injection-moulding processes.

In addition to the above-mentioned parameters, the geometry of the component to be produced also affects the parameterised model. For the component to be produced, a specific geometry is desired which in turn affects the model as such in the form of parameters. The component geometry can, for example, in addition to the overall shape which is generally firmly predetermined, comprise multiple layers or be divided into multiple layers and have variable parting surfaces, i.e. variable layer thicknesses. The number of layers can vary.

Another special feature is the fact that certain parameters cannot be predetermined as concrete values, but have to be stated as a function of e.g. temperature or time or another freely selectable variable.

On the basis of the predetermined parameters, the model is first appropriately parameterised, based on which, finally, the underlying injection-moulding process is to be optimised. After parameterising the model, this model is first validated, i.e. its validity is checked with real values. This is generally carried out only once.

Furthermore, for each geometry (in the event that different numbers of layers are present for different geometries) a test calculation is performed and, following this, a type of macro is recorded with a postprocessor, with which, from that point onwards, all of the other calculations can be evaluated in the same way. This postprocessor is a program for evaluating the results of simulations. If the model is validated, i.e. if the model reflects real behaviour, the now parameterised model is taken up in the proposed computer-implemented method, so that the proposed steps of the method can be carried out accordingly based on the parameterised model. For the method to be implemented, the parameters that are to be varied in the underlying parameterised model are first predetermined. These can be, on the one hand, both the component geometry and the above-mentioned parameters, which include the injection-moulding parameters, optionally also the material properties, and other physical parameters.

Furthermore, before starting to implement the proposed method, a model response is predetermined, in terms of which the injection-moulding process is to be optimised. Examples of model responses are:
maximum temperature in the component to be produced;
overall injection-moulding process time;
time to reach a particular demoulding temperature.

The time to reach the demoulding temperature directly determines the cycle rates prevailing in the injection-moulding process, which should, for example, be minimised or kept as low as possible when optimising the injection-moulding process. This means that it can be a target, for example, to minimise the earliest possible point for demoulding or the time to reach this point.

In general, however, it proves far from easy to determine demoulding times, since in a multi-layer injection moulding process, for example, the component to be produced is not injected in one go, with an associated demoulding time, but rather a first layer, a so-called preform, is first injected and cooled until its demoulding temperature is reached. Only then, or precisely then, is the mould opened and the preform transferred into a subsequent cavity of the same mould, e.g. with the aid of a rotary table, an index plate, a sliding table or a robot. There, a second layer is injected over the preform. The use of two or more independent injection-moulding machines and moulds is also conceivable. In this case, each machine can be responsible for injecting one layer, and the mouldings are transferred between the machines by suitable means. In the proposed computer-implemented method, however, it is not known in advance how long it will take until a demoulding temperature of a component to be produced is reached. This must first be determined in an initial calculation. To this end, a significantly longer cooling time than necessary is set, and the point at which the particular cooling temperature or demoulding temperature has been reached is monitored. In simulations, however, this can also be set automatically by means of a stop criterion, i.e. the simulation is run for precisely as long as it takes for the temperature to fall below the demoulding temperature everywhere. The value determined is then used again to calculate the first layer, i.e. the preform, precisely up to the time of the previously determined demoulding temperature. When calculating the simulation of the preform, a corresponding temperature profile is also determined. The second layer is then simulated. When calculating the second layer, again the time to reach the demoulding temperature is first calculated for the now two layers in combination. Here, the specific temperature profile of the preform can be used as a guide. Furthermore, the cooling behaviour between the individual steps can also be simulated, e.g. if the preform is stored temporarily for a long time, or if it takes a few minutes until the preform is overmoulded, or even if it takes only a few seconds until the preform is back-injection-moulded. The procedure described can run automatically with the aid of scripts and macros, in which case only a single input is then required. In this case, there is a script that implements the following: 1. start calculation; on completion of the calculation, start a second script to evaluate the preform demoulding time and enter into another computing deck, 2. start calculation and, here again, on completion of the calculation, start a second script that evaluates the results and outputs the demoulding time. The second script (to determine demoulding time 1) loads a macro, in which the calculation is evaluated and the temperature curve over time is output as tabular pairs of values. In an additional script, the point at which the temperature falls below the demoulding temperature is extracted from the table. Here, the demoulding temperature is then interpolated between the two points (immediately before the demoulding temperature and immediately after the demoulding temperature), so that the determination of the time takes place even more accurately (since, in the calculation, the demoulding temperature is not obtained accurately unless by chance, with deviations of 1-2° C. being the rule here.) The time obtained from this is output into a new file, which is then integrated in another subscript into the second model (in which the postform is also included in the calculation). For the calculation and the scripting of the post-form, analogous scripts then run (except that the end time is not then integrated into a calculating model again).

This means that, in the case as described here, it is necessary to provide a successive determination of the demoulding time, i.e. the time to reach the demoulding temperature, accompanied by a repeated implementation of the proposed method for each of the two layers in order to determine a minimum value for a total duration of the required cooling time.

In another possible embodiment of the proposed method, the determination of the respective relative influence of the individual parameters on the value for the model response performed in step a1) takes place by means of a graphic evaluation. This means, for example, that if all of the resulting values for the predetermined model response for a parameter, for various values of this parameter, lie on a straight line, the slope of the straight line can provide information on how great the relative influence of the corresponding parameter is on the value for the model response. For example, the relative influence can be greater, the greater the slope of the straight line on which the values for the model response for the various parameter values of the respective parameter lie. The graphic evaluation takes place in order to define the influences of the parameters. As described in the preceding paragraphs, firstly all of the parameters with all of the parameter values are varied among themselves. A graphic evaluation as described here is therefore meaningful. The parameters can also follow a curved shape, in which case e.g. tendencies, minima/maxima or a curve can be read off against a limit value.

On the basis of this evaluation, 1 to 5, preferably 2 to 3, parameters are then defined as primary characteristics. These are preferably those parameters with the greatest relative influence. According to one possible embodiment, their correlation with one another is then investigated in relation to the value for the model response in another step. In this case, the parameter values of the parameters not identified as primary characteristics are kept constant.

While the number of primary characteristics is generally lower than the total number of parameters affecting the model, the number of parameter values used to determine the correlation of the primary characteristics with one another is increased relative to the preceding step a) provided, according to which, for each of the individual parameters, a value is determined for the predetermined model response for various parameter values of the respective parameter. This means, for example, if the parameter "cooling time" has a large relative influence on the value of the predetermined model response and, in step a) provided, parameter values of 50 seconds and 500 seconds are selected for the parameter "cooling time", then in step b), after it has been shown that this parameter has a large influence, the parameter "cooling time" is first included in the group of primary characteristics and then in step c), when determining the correlation of the primary characteristics with one another in relation to the value for the model response for the parameter "cooling time", more parameter values are used, such as e.g. values of 50, 100, 200, 300, 400 and 500 seconds. For a parameter "mould temperature", which after carrying out step a) of the method, which precedes step b), shows only a small relative influence on the value of the predetermined model response, parameter values of 60° C. and 120° C. being assumed for this parameter, and which is not included in the group of parameters that are defined as primary characteristics in step b), when determining the correlation in step c) only a constant value, such as e.g. 60° C., is assumed.

Using the results from step c) of the proposed method, information can be obtained on how the primary characteristics relate to one another and in which constellations, i.e. with which parameter values of the individual primary characteristics, the best results can be achieved in terms of the value for the model response. These constellations of the primary characteristics can then be used as starting values for subsequent optimising of the model in terms of a target value for the predetermined model response. Furthermore, respective tolerance ranges for the primary characteristics can be derived therefrom.

In the actual optimisation step, the parameter values of the primary characteristics in the respective tolerance ranges are determined proceeding from the starting values, and finally the resulting value for the model response is determined If the model response is e.g. the time to reach the earliest possible point for demoulding, and if the target value is a minimum, then on the one hand a concrete value is obtained here for this period of time, which corresponds to a minimum, or at least comes as close to this as possible, and on the other hand optimised parameter values for the primary characteristics, which lead to this value, are obtained. The parameter values thus obtained for the primary characteristics can, in turn, be set as corresponding starting parameter values on a real injection-moulding machine, so that the real injection-moulding process finally performed can be performed on the basis of these optimised parameter values.

There is also the possibility of defining other parameters from all of the parameters to be predetermined, for which a correlation is also to be determined in relation to the value for the model response, even if these parameters do not have such a high relative influence on the value for the model response as the previously determined primary characteristics. By means of this procedure, for these less influential parameters too, starting values are obtained for an optimisation of the model to be carried out. In this case, the starting values determined for the primary characteristics are kept constant.

When defining respective tolerance ranges for the primary characteristics, it should be borne in mind that there are boundary conditions that have to be met, i.e. that cannot be varied at will. These conditions are generally given as numerical values which are defined with <=, =and>=and relate specifically to the model response to be predetermined. As the optimisation target, generally only one is defined which relates to the desired or targeted value for a model response to be predetermined. If, for example, the "cycle time" is selected as the model response, a target value for the "cycle time" would be a minimum. In the case of the model response "quality characteristic", a minimum value first has to be met. This is then guaranteed by means of a corresponding boundary condition. Optimisation is firstly performed until all of the boundary conditions are met and only then is optimisation performed in terms of the optimisation target or of the desired value of the model response.

Boundary conditions to be observed can, moreover, be provided e.g. by material properties of the material used for the injection moulding. Among the material properties, in particular heat capacity, thermal conductivity, thermal expansion, glass transition temperature, solidification point, melt temperature, viscosity and density should be taken into account. The material properties here relate to the material to be used for producing the respective component.

After defining the starting values for an optimisation to be carried out and the respective tolerance ranges for the corresponding primary characteristics, taking into account the boundary conditions to be observed, the optimisation, i.e. step c) of the proposed method, is performed. Simulation models are automatically calculated for the parameter values in the respective tolerance ranges and the values for the model response are determined. The values obtained for the model response are then evaluated, taking into account boundary conditions to be observed and the target value for the model response, the actual results obtained being compared with one another and thus the underlying parameter values of the primary characteristics being optimised. When the optimisation target is reached or no more significant changes occur, and all of the boundary conditions are met, the optimisation is ended and the parameter values of the primary characteristics that have led to this optimum result are given. These parameter values are then to be used to carry out a real method on a corresponding injection-moulding machine.

In practice, further process optimisations generally still have to be carried out later on the real injection-moulding machine, but these are considerably less time-consuming than without the previously performed optimisation. The proposed method is specifically targeted and a "trial and error" method is no longer necessary.

As a result, a finishing step after initial injection-moulding tests can be significantly reduced. A number of grinds is minimised by the optimised setting of parameters on an injection-moulding machine in advance. The cycle time can be minimised, based on measurable values. Temperature measurements inside a component are not possible in the prior art. Although such measurements are still not possible using the proposed method, it is, however, possible to simulate and thus to determine a temperature distribution in a component to be produced. This temperature distribution can be reproduced by practical tests with temperature sensors in the actual mould and the accuracy of the quantitative temperature distribution can be increased. This then corresponds to a validation of the calculating models. While it is true that the measurement is still not a measurement of the temperature in the core (as a temperature sensor also dissipates heat), however, if the temperature sensor is included in the model and the measurements in the experiment correspond with the temperature curve in the simulation, the model is correct. Only knowledge of the temperature distribution in the component allows an actual optimisation the cycle times and of the underlying injection-moulding process. This is only possible with the aid of the proposed method. By means of the proposed method, not only can information be obtained about the temperature distribution, but knowledge can also be gained regarding internal stress, resulting deformation etc. In this way, the quality of a component to be produced can be determined and optimised in advance as a function of component geometry and injection moulding conditions.

The proposed method for optimising an injection-moulding process for producing thick-walled components is carried out based on a parameterised model. This model can in turn be based on a standard injection moulding machine with e.g. a two-cavity injection-moulding tool. A standard injection moulding machine of this type with a two-cavity injection-moulding tool offers the possibility e.g. of injection moulding a sheet-like optical component with 50×50×20 mm edge length and highly polished surfaces in three layers, the preform optionally having e.g. wall thicknesses of 30, 50 and 70% of a total wall thickness of 20 mm As materials for optical components, all melt-processable plastics are suitable, e.g. poly-carbonate (PC), polyesters, in particular polybutylene terephthalate (PBT) or polyethylene terephthalate (PET), polyamide (PA), polyethylene (PE), polypropylene (PP), polystyrene (PS), poly(acrylonitrile-co-butadiene-co-styrene) (ABS), poly(acrylonitrile-co-styrene-co-acrylate) (ASA), poly(styrene-co-acrylonitrile) (SAN), polyoxymethylene (POM), cyclic polyolefins (COC), polyphenylene oxide (PPO), polymethyl methacrylate (PMMA), polyphenylene sulfide (PPS), polyvinyl chloride (PVC) and blends thereof.

A component geometry of an optical component to be produced, such as e.g. an optical lens, can provide e.g. a wall thickness of more than 5 mm, preferably more than 10 mm, and edge lengths of 5 to several 100 mm.

The injection of an optical component by the injection-moulding process to be optimised can take place by a multi-layer injection-moulding process from a thermoplastic polymer. The injection-moulding process is adequately known from the prior art. In connection with this, reference is made to a document by Döbler, Protte, Klinkenberg "Freie Fahrt for weißes Licht—LED-Optiken", published in Kunststoffe April 2009, pp. 83-86. By means of the proposed method of optimising an underlying injection-moulding process for producing thick-walled components, in particular optical components, it is achieved that e.g. a demoulding of an optical component to be produced no longer has to be estimated on the basis of approximate values and measurement results but that temperature curves and cooling processes inside the component to be produced are made visible and can therefore be understood significantly better.

By means of the proposed method it is possible to reduce a cycle time for an injection-moulding process, since the time to reach the earliest possible point for demoulding the optical component can be minimised by the method, by defining values for the parameters on which the model is based for which the time to reach the earliest possible point for demoulding reaches a minimum. This time is directly associated with the cycle time or cycle rate of the injection-moulding process, which is highly significant particularly for mass production.

Furthermore, by means of the present disclosure, a computer program with program code is covered, which is suitable for implementing a method according to the invention when the computer program runs on an appropriate processing unit. Both the computer program itself and stored on a computer-readable medium (computer program product) are claimed.

To carry out the proposed computer-implemented method, it is possible to use software known from the prior art. For example, the software package "HyperWorks®" from Altair can be used. This contains programs for post-processing (HyperView®, HyperGraph®) and optimisation codes (HyperStudy®, HyperOpt®). The program HyperView® can be used e.g. to analyse temperatures and HyperStudy® to control the automatic optimisations. With the program HyperStudy®, in addition to the optimisation step, the steps of the proposed method preceding the optimisation step can also be carried out. To create the parameterised model based on which the proposed method is carried out, it is also possible to use software known from the prior art, which is suitable to carry out a simulation for an injection-moulding process to include injection-moulding parameters. In this case, e.g. the software Moldflow® can be used. Furthermore, there are other programs that are suitable to determine rheological behaviour, such as e.g. CADMould®. These programs are based mathematically on an Euler approach.

The software package HyperWorks® from Altair comprises a number of independent modules, which can be combined with one another by file sharing. Accordingly, use of individual modules is also possible. In the context of the proposed method, as already mentioned, in particular HyperView® and HyperStudy® as well as HyperGraph® and HyperOpt® can be used. HyperView® is a finite element and multi-body system postprocessor. HyperStudy® is a solver-independent optimisation tool. HyperGraph® is used to create graphs from the calculations that have been performed and the module HyperView® is a graphic postprocessor, which can reproduce the distribution of result values in the component, such as e.g. stresses, torsions and deformations, as a so-called contour plot.

Further advantages and embodiments of the invention can be taken from the description and the attached drawing.

It is understood that the above-mentioned features, and those still to be explained below, can be used not only in the combination stated in each case, but also in other combinations or individually, without leaving the framework of the present invention.

The invention is illustrated diagrammatically in the drawing on the basis of an exemplary embodiment and is described in detail below with reference to the drawing.

DETAILED DESCRIPTION

Figure 1:
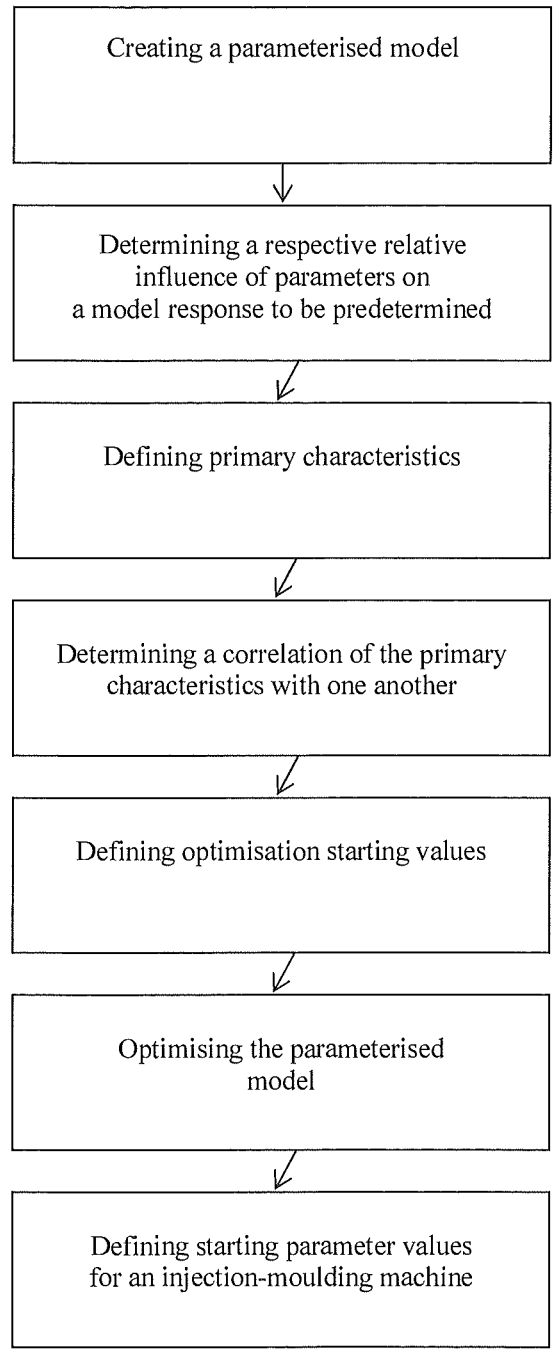
FIG. 1 shows a diagrammatic representation in the form of a flow diagram of the progress of one possible embodiment of the proposed method for optimising an injection-moulding process for producing thick-walled components, in particular optical components.

FIG. 1 shows a flow diagram of one embodiment of the proposed computer-implemented method for optimising an injection-moulding process for producing thick-walled components, in particular optical components, based on a model to be parameterised on the basis of parameters to be predetermined.

In a first step, the parameterised model is first created, based on which the injection-moulding process is optimised. The parameterised model is based on parameters to be predetermined. These parameters first have to be selected from the parameters that enter into the particular injection-moulding process and have an influence on the injection-moulding process. On the one hand, these are parameters that enter into a component geometry of the component to be produced, such as e.g. a number of layers and a layer thickness of the component to be produced, which can be e.g. an optical lens. Apart from material properties, so-called injection-moulding parameters also have to be taken into account, which have a direct or indirect influence on the injection-moulding process. These include, inter alia, melt temperatures, mould temperatures, cooling times, cooling rates, a so-called change-over point, a holding pressure profile and an injection profile. The so-called change-over point is defined by injection time, injection pressure, screw position, locking force and volume. The injection profile is defined by injection time, volume throughput, screw position and rate of advance of the screw.

After predetermining these parameters, the model is created; software from the prior art can be used for this. For example, the above-mentioned software Moldflow® can be used for this purpose. Furthermore, it is also possible to use other programs, such as e.g. CADMould®. The calculating codes and mathematical approaches of these programs are based mathematically on an Euler approach. For a simulation for solid phases and also for liquid phases, it is also possible to use a program called Abaqus® from Dassault Systems. This is a finite element program, in which the implicit solver can be used. Other programs that can be employed are e.g. Ansys® and Radioss®. This software is preferably used as it is based on ASCII-formatted data and thus can be readily combined with another program subsequently used for optimisation, by the name of HyperWorks®.

After creating the parameterised model, which corresponds to a simulation model, according to the embodiment of the method described here, for each of the individual parameters a value is now firstly determined for a model response to be predetermined for various parameter values of the respective parameter. From this, a relative influence of the individual parameters on the value for the model response can be determined. The model response can be e.g. a maximum temperature in the component, a total duration of the injection-moulding process or a time to reach the earliest possible point for demoulding.

After the determination, or based on the resulting relative influences of the individual parameters on the value for the model response, a group of parameters are defined as primary characteristics. In a following step, a correlation of the primary characteristics is then determined in relation to the value for the model response for various parameter values of the individual primary characteristics. Based on the correlation of the primary characteristics thus determined, parameter values for the primary characteristics are defined as starting values for subsequent optimisation of the model. Furthermore, respective tolerance ranges are determined for the primary characteristics. All of these steps can take place by simulation. However, the results that are important for the next step can also be based on experimental values.

In a subsequent step, finally, the parameter values of the primary characteristics are optimised in terms of a target value of the model response in the respective tolerance ranges. The target value of the model response, depending on the model response, can be e.g. a maximum or a minimum of the model response. If the model response is e.g. the duration of the injection-moulding process then, for example, the target value is generally a minimum of the total duration of the injection-moulding process. If the model response is the time to reach the earliest possible point for demoulding of the component to be produced, then to reduce the cycle times the target value of the model response will also be a minimum of the model response, which means that the time to reach the earliest possible point for demoulding is as short as possible.

Furthermore, material properties of the material used for injection moulding play a part in relation to boundary conditions to be observed. Material properties include, inter alia, heat capacity, thermal conductivity, thermal expansion and a so-called no-flow temperature, which corresponds to a temperature limit for which it is assumed that the material being used, in particular a plastics material, no longer flows when cooled below this temperature. Furthermore, material properties include transition temperature, glass transition temperature, solidification point, melt temperature, D3 coefficient, which expresses a pressure dependency of viscosity, C1/C2 coefficient, viscosity, creep behaviour, modulus of elasticity, density and PVT data of the material used.

In general, however, it does not necessarily have to be an extreme value of the model response that is targeted. If the model response corresponds e.g. to a maximum temperature in the core of the component to be produced, then the target value of the model response can be e.g. the glass transition temperature at which or below which demoulding is possible.

After optimising the parameter values for the individual primary characteristics, the value for the model response can be determined for these optimised parameter values.

In a last step, finally, the calculated optimised parameter values of the primary characteristics are set as corresponding starting parameter values on a real injection-moulding machine. Thus, the optimisation results are finally tested in practice and optionally also finely adjusted.

The invention claimed is:

1. A computer-implemented method for optimising a multi-layer injection moulding process for producing thick-walled components based on a model to be parameterised on the basis of parameters to be predetermined, wherein a component to be produced is represented in the model with a component geometry, the method comprising:
   a) for each of the individual parameters, determining a value for a predetermined model response for various parameter values of the respective parameter and a resulting relative influence of the individual parameters on the value for the model response,
   b) defining a group of parameters as primary characteristics on the basis of the relative influence of the individual parameters on the predetermined model response determined in step a),
   c) determining a correlation of the primary characteristics in relation to the value for the model response for various parameter values of the individual primary characteristics,
   d) defining parameter values for the primary characteristics as starting values for subsequent optimising of the model and respective tolerance ranges for the primary characteristics on the basis of the correlation determined in step c),
   e) optimising the parameter values of the individual primary characteristics in terms of a target value of the model response in the respective tolerance ranges proceeding from the starting values from step d), and
   f) setting the optimised parameter values from step e) as corresponding starting parameter values on an injection-moulding machine.

2. The method according to claim 1, wherein the component geometry comprises a layer thickness and a number of layers.

3. The method according to claim 1, wherein the target value of the model response corresponds to an extreme value, in particular a maximum or minimum of the model response.

4. The method according to claim 1, wherein the method, retaining the optimised values for the primary characteristics from step e), further comprises the following step:
   e1) determining a correlation of the remaining parameters in relation to the value for the model response for various parameter values of the individual remaining parameters and, from there, defining parameter values for the remaining parameters as starting values for the subsequent optimising of the model and respective tolerance ranges for the remaining parameters,
   e2) optimising the parameter values of the remaining parameters in terms of the target value of the model response in the respective tolerance ranges proceeding from the starting values from step e1), wherein step e1) and step e2) are to be implemented after step e).

5. The method according to claim 4, wherein the method further comprises the following step:
   e3) determining the value for the model response for the optimised parameter values.

6. The method according to claim 1, wherein the parameters to be predetermined are selected from a group consisting of component geometry parameters, such as layer thickness, number of layers, of injection-moulding parameters, such as mould temperatures, melt temperatures, injection-moulding process settings, pressures, cooling times, cooling rates at the mould wall, injection profile, change-over point, holding pressure profile, of material properties, such as heat capacity, thermal conductivity, thermal expansion, glass transition temperature, solidification point, melt temperature, viscosity, density, and of other physical influences, such as gravity and inertia.

7. The method according to claim 6, wherein the parameters to be predetermined are predetermined as a function of another variable, such as temperature, time or another freely selectable field variable.

8. The method according to claim 1, wherein, when determining the value for the model response for each of the individual parameters for a particular parameter, 1 to 5, in particular 2 parameter values, in particular a minimum and a maximum value, are given.

9. The method according to claim 1, wherein 1 to 5 parameters, starting with the parameter with the greatest relative influence and in the case of more than one parameter continuing with the immediately following parameters in terms of relative influence, are defined as primary characteristics.

10. The method according to claim 1, wherein the determining of the respective relative influence of the individual parameters on the value for the model response carried out in step a) takes place by means of graphic evaluation.

11. The method according to claim 1, wherein in step c), when determining a correlation of the primary characteristics in relation to the value for the model response for various parameter values of the individual primary characteristics, in each case 3 to 10 different parameter values are used for the individual primary characteristics.

12. The method according to claim 1, wherein, during the optimisation in step e), boundary conditions are defined which have to be met.

13. The method according to claim 1, in which the model response is predetermined from the group consisting of maximum temperature in the component, total duration of the injection-moulding process and time to the earliest possible point for demoulding.

14. A computer program with program code, which is suitable for implementing a method according to claim 1 when the computer program runs on an appropriate computing device.

* * * * *